United States Patent

(12) United States Patent
Yuasa

(10) Patent No.: US 11,367,563 B2
(45) Date of Patent: Jun. 21, 2022

(54) COIL UNIT

(71) Applicant: Toyota Jidosha Kabushiki Kaisha, Toyota (JP)

(72) Inventor: Hiroaki Yuasa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 299 days.

(21) Appl. No.: 16/598,422

(22) Filed: Oct. 10, 2019

(65) Prior Publication Data
US 2020/0118738 A1 Apr. 16, 2020

(30) Foreign Application Priority Data
Oct. 12, 2018 (JP) .............................. JP2018-193071

(51) Int. Cl.
H01F 27/02 (2006.01)
H01F 27/36 (2006.01)
H01F 27/28 (2006.01)
H01F 38/14 (2006.01)

(52) U.S. Cl.
CPC ............. H01F 27/36 (2013.01); H01F 27/02 (2013.01); H01F 27/28 (2013.01); H01F 38/14 (2013.01)

(58) Field of Classification Search
CPC .......... H01F 27/36; H01F 27/02; H01F 27/28; H01F 38/14; H01F 5/00; H01F 5/04; H01F 27/361; H01F 27/363; H01F 27/366
See application file for complete search history.

(56) References Cited

U.S. PATENT DOCUMENTS

| 10,447,086 | B2* | 10/2019 | Yuasa | H02J 50/12 |
| 10,737,579 | B2* | 8/2020 | Doi | B60L 53/38 |
| 10,833,537 | B2* | 11/2020 | Doi | H02J 7/0042 |
| 2008/0129246 | A1 | 6/2008 | Morita et al. | |
| 2013/0127409 | A1 | 5/2013 | Ichikawa | |
| 2013/0193749 | A1 | 8/2013 | Nakamura et al. | |

(Continued)

FOREIGN PATENT DOCUMENTS

| JP | 2008-120239 A | 5/2008 |
| JP | 2013-063014 A | 4/2013 |

(Continued)

OTHER PUBLICATIONS

Notice of Allowance pertaining to corresponding U.S. Appl. No. 15/531,176 dated Mar. 18, 2019.

Primary Examiner — Tuyen T Nguyen
(74) Attorney, Agent, or Firm — Dinsmore & Shohl LLP

(57) ABSTRACT

A power-reception-side coil unit includes: a housing, a ferrite, a power reception coil, a shield, and a metal member. The metal member includes a peripheral wall, a partition wall, and a shield. The ferrite includes a first principal surface, and a second principal surface. The power reception coil is provided on the side of the second principal surface, and the shield is provided on the side of the first principal surface. The shield has an outer peripheral edge including a step portion extending away from the first principal surface. The ferrite includes an exposed part exposed through the shield by forming the step portion. In the separation direction from the outer peripheral edge of the ferrite plate to the metal member, the length from the outer peripheral edge of the ferrite plate to the metal member is longer than the length of the exposed part.

3 Claims, 7 Drawing Sheets

(56) References Cited

U.S. PATENT DOCUMENTS

2015/0008877 A1* 1/2015 Ichikawa ............. H04B 5/0037
320/108
2017/0326994 A1 11/2017 Yuasa et al.

FOREIGN PATENT DOCUMENTS

| | | |
|---|---|---|
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2013-175621 A | 9/2013 |
| JP | 2013-229988 A | 11/2013 |
| JP | 5592242 B2 | 9/2014 |
| JP | 2016-103589 A | 6/2016 |
| JP | 2018-082595 A | 5/2018 |

* cited by examiner

COIL UNIT

CROSS REFERENCE TO RELATED APPLICATIONS

This nonprovisional application claims priority to Japanese Patent Application No. 2018-193071 filed on Oct. 12, 2018 with the Japan Patent Office, the entire contents of which are hereby incorporated by reference.

BACKGROUND

Field

The present disclosure relates to a coil unit for use in wireless power transmission.

Description of the Background Art

Japanese Patent Laid-Open No. 2016-103589 discloses a power-reception-side coil unit and a power-transmission-side coil unit (which may also be referred to as a "coil unit" as a general term when there is no need to distinguish them) for use in, a wireless charging system. The coil unit includes a ferrite, a coil, a shield for blocking an electromagnetic wave generated by the coil, and a housing containing these components. The housing is composed of a metal housing body and a resin cover covering the housing body. The shield is provided on a first principal surface of the ferrite, and the coil is provided on a second principal surface of the ferrite opposite to the first principal surface.

The outer peripheral edge of the coil is located on the inner side relative to the outer peripheral edge of the ferrite, and the outer periphery of the second principal surface is exposed. The shield has a step portion on its outer periphery, the step portion extending away from the first principal surface of the ferrite. By providing the step portion, the outer periphery of the first principal surface is exposed.

SUMMARY

In recent years, for a vehicle, there is a desire for improving the charging efficiency in a wireless charging system for wireless charging. As one method for improving the wireless charging efficiency, the coefficient of coupling between coil units used in a wireless charging system may be increased. If a wireless charging system uses the coil unit disclosed in Japanese Patent Laid-Open No. 2016-103589, the magnetic flux emitted from the other coil unit can come around to the exposed part of the first principal surface of the ferrite (hereinafter also referred to as an "exposed part"), for example. This can increase the amount of magnetic flux incident on the ferrite, thus increasing the coefficient of coupling.

A housing of a coil unit includes a peripheral wall rising up from the housing body toward the cover at the outer periphery of the housing body. With such a housing, if the length from the outer peripheral edge of the ferrite to the peripheral wall of the housing body is short in the direction from the outer peripheral edge of the ferrite to the peripheral wall (hereinafter also referred to as a "separation direction"), the magnetic, flux emitted from the other coil unit may be interlinked with the peripheral wall. This may reduce the amount of magnetic flux coming around to and incident on the exposed part, thus possibly reducing the coefficient of coupling.

The present disclosure has been made to solve such a problem. An object of the present disclosure is to increase the coefficient of coupling in wireless charging.

A coil unit according to the present disclosure includes: a housing including a housing body made of metal, and a cover made of resin provided on the housing body; and a ferrite plate, a coil, a shield, and a metal member provided in the housing. The housing body includes a metal plate member, the metal plate member including an inside principal surface and an outside principal surface. The cover is provided on the side of the inside principal surface and covers the metal plate member. The ferrite plate includes a first principal surface facing the inside principal surface, and a second principal surface located opposite to the first principal surface. The coil is provided on the side of the second principal surface. The shield is provided an the side of the first principal surface. The metal member is adjacent to the coil and provided on the side of the inside principal surface of the housing body. The shield has an outer peripheral edge including a step portion extending away from the first principal surface. The ferrite plate includes an exposed part exposed through the shield by forming the step portion. In the separation direction from the outer peripheral edge of the ferrite plate to the metal member, the length from the outer peripheral edge of the ferrite plate to the metal member is longer than the length of the exposed part.

According to the above-described configuration, the step portion extends away from the first principal surface of the ferrite at the outer peripheral edge of the shield. Thus, a part of the first principal surface of the ferrite plate is exposed through the shield (exposed part). In the separation direction from the outer peripheral edge of the ferrite plate to the metal member, the length from the outer peripheral edge of the ferrite plate to the metal member is longer than the length of the exposed part. Thus, by securing a long length from the outer peripheral edge of the ferrite plate to the metal member in the separation direction, the magnetic flux emitted from one coil unit is prevented from being interlinked with the metal member of the other coil unit during wireless charging, for example. Therefore, the magnetic flux can easily come around to the exposed part. This can increase the amount of magnetic flux incident on the coil unit, thus increasing the coefficient of coupling.

In an embodiment, the coil surrounds the winding axis passing through the first principal surface and the second principal surface of the ferrite plate. The coil has an outer peripheral edge including an edge part extending along the outer peripheral edge of the ferrite plate. In the separation direction, the length from the edge part to the outer peripheral edge of the ferrite plate is shorter than the length of the exposed part.

According to the above-described configuration, in the separation direction, the length from the edge part of the coil to the outer peripheral edge of the ferrite plate is shorter than the length of the exposed part. That is, at the edge part, the coil stretches close to the outer peripheral edge of the ferrite plate. Accordingly, the magnetic flux emitted from the other coil unit can easily expand in the direction toward the outside of the housing, and thus can easily come around to the first principal surface of the ferrite plate. This allows the magnetic flux to be easily incident on the exposed part of the first principal surface of the ferrite plate, thus increasing the amount of magnetic flux incident on the exposed part.

In an embodiment, the length from the outer peripheral edge of the ferrite plate to the metal member is twice or more as long as the length of the exposed part.

According to the above-described configuration, in the separation direction, the length from the outer peripheral edge of the ferrite plate to the metal member is twice or more as long as the length of the exposed part. Thus, the magnetic flux emitted from one coil unit is more reliably prevented from being interlinked with the metal member of the other coil unit during wireless charging, for example. Therefore, the magnetic flux can easily come around to the exposed part. This can increase the amount of magnetic flux incident on the coil unit, thus increasing the coefficient of couplings.

The foregoing and other objects, features, aspects and advantages of the present disclosure will become more apparent from the following detailed description of the present disclosure when taken in conjunction with the accompanying drawings.

DETAILED DESCRIPTION

Figure 1:
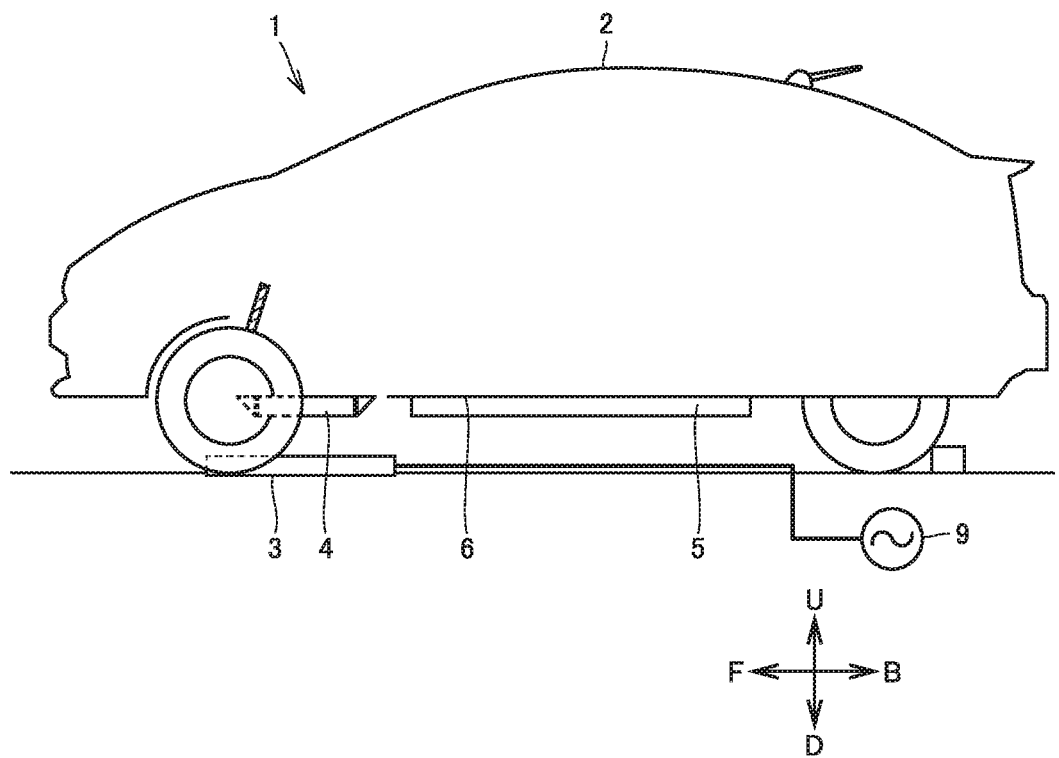
FIG. 1 is a general view of a wireless charging system according to an embodiment.

Hereinafter, the present embodiment is described in detail with reference to the drawings. In the drawings, identical or corresponding parts are identically denoted, and the explanation thereof is not repeated.

<General Configuration>

FIG. 1 is a general view of a wireless charging system according to the present embodiment. With reference to FIG. 1, a wireless charging system 1 includes a vehicle 2 and a power-transmission-side coil unit 3. Power-transmission-side coil unit 3 is installed on the ground.

Hereinafter, in a parking space where power-transmission-side coil unit 3 is installed, the direction of movement of vehicle 2 is defined as F and B directions, and the up and down directions relative to the ground are respectively defined as U and D directions. Although not shown in FIG. 1, the right and left directions relative to vehicle 2 in a parking space are respectively defined as R and L directions. Hereinafter, the U direction may be simply referred to as "upper side", "upper face" and the like, and the D direction may be simply referred to as "lower side", "lower face" and, the like.

Vehicle 2 includes a floor panel 6, a power-reception-side coil unit 4, and a power storage device 5. Floor panel 6 is a metal plate that forms the bottom face of vehicle 2. Power-reception-side coil unit 4 and power storage device 5 are provided on the lower face of floor panel 6. Power-reception-side coil unit 4 is disposed in the F direction relative to power storage device 5.

Power-transmission-side coil unit 3 receives power supplied from an AC power supply 9 (e.g., a commercial grid power supply). Power-transmission-side coil unit 3 is configured to wirelessly transmit power to power-reception-side, coil unit 4 via a magnetic field while vehicle 2 is aligned such that power-reception-side coil unit 4 of vehicle 2 faces power-transmission-side coil unit 3.

Figure 2:
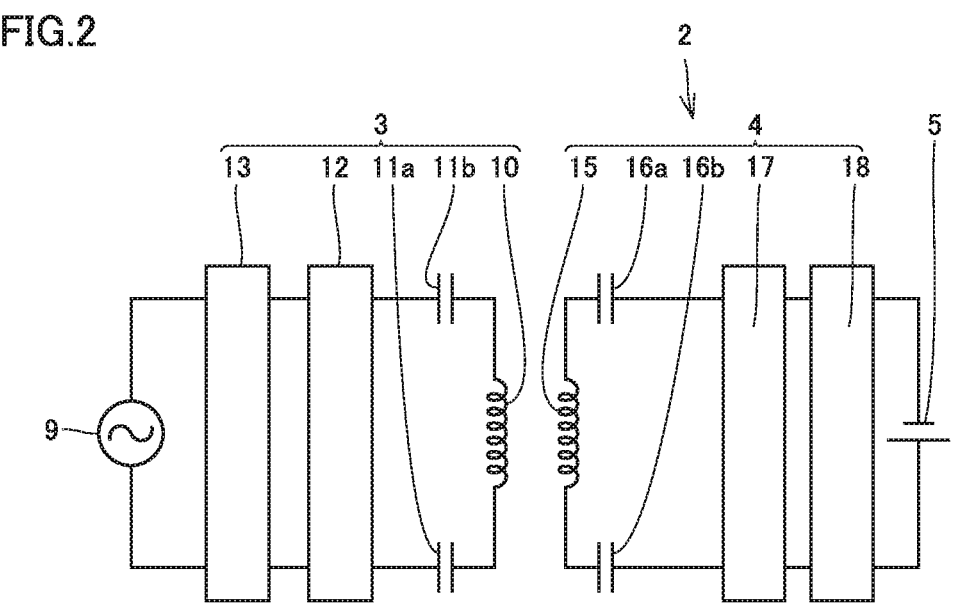
FIG. 2 is a diagram schematically showing an electrical configuration of a wireless charging system.

FIG. 2 is a diagram schematically showing an electrical configuration of wireless charging system 1 shown in FIG. 1. Power-transmission-side coil unit 3 includes a power transmission coil 10, resonant capacitors 11a, 11b, a filter 12, and an inverter 13. Power transmission coil 10 and resonant capacitors 11a, 11b form a resonant circuit having a Q factor of, for example, 100 or more.

Power-reception-side coil unit 4 includes a power reception coil 15, resonant capacitors 16a, 16b, a filter 17, and a rectifier 18. Power reception coil 15 and resonant capacitors 16a, 16b form a resonant circuit having a Q factor of, for example, 100 or more.

For wireless power transmission from power-transmission-side coil unit 3 to power-reception-side coil unit 4, AC power is supplied from AC power supply 9 to inverter 13. Inverter 13 boosts the voltage of the supplied AC power, adjusts the frequency of the supplied AC current, and supplies it to filter 12. Filter 12 is, for example, an LC filter. Filter 12 removes noise from the AC power supplied from inverter 13, and supplies it to the resonant circuit. When the AC power is supplied to the resonant circuit, an electromagnetic field is formed around power transmission coil 10.

Power reception coil 15 receives power from the electromagnetic field formed around power transmission coil 10. This causes a current to flow in power reception coil 15 and for an electromagnetic field around power reception coil 15. The AC power received by power reception coil 15 is supplied to filter 17. Filter 17 is, for example, an LC filter. Filter 17 removes noise from the AC power supplied from power reception coil 15, and supplies it to rectifier 18. Rectifier 18 converts the supplied AC power into DC power, and supplies the DC power to power storage device 5.

<Power-Reception-Side Coil Unit>

Figure 3:
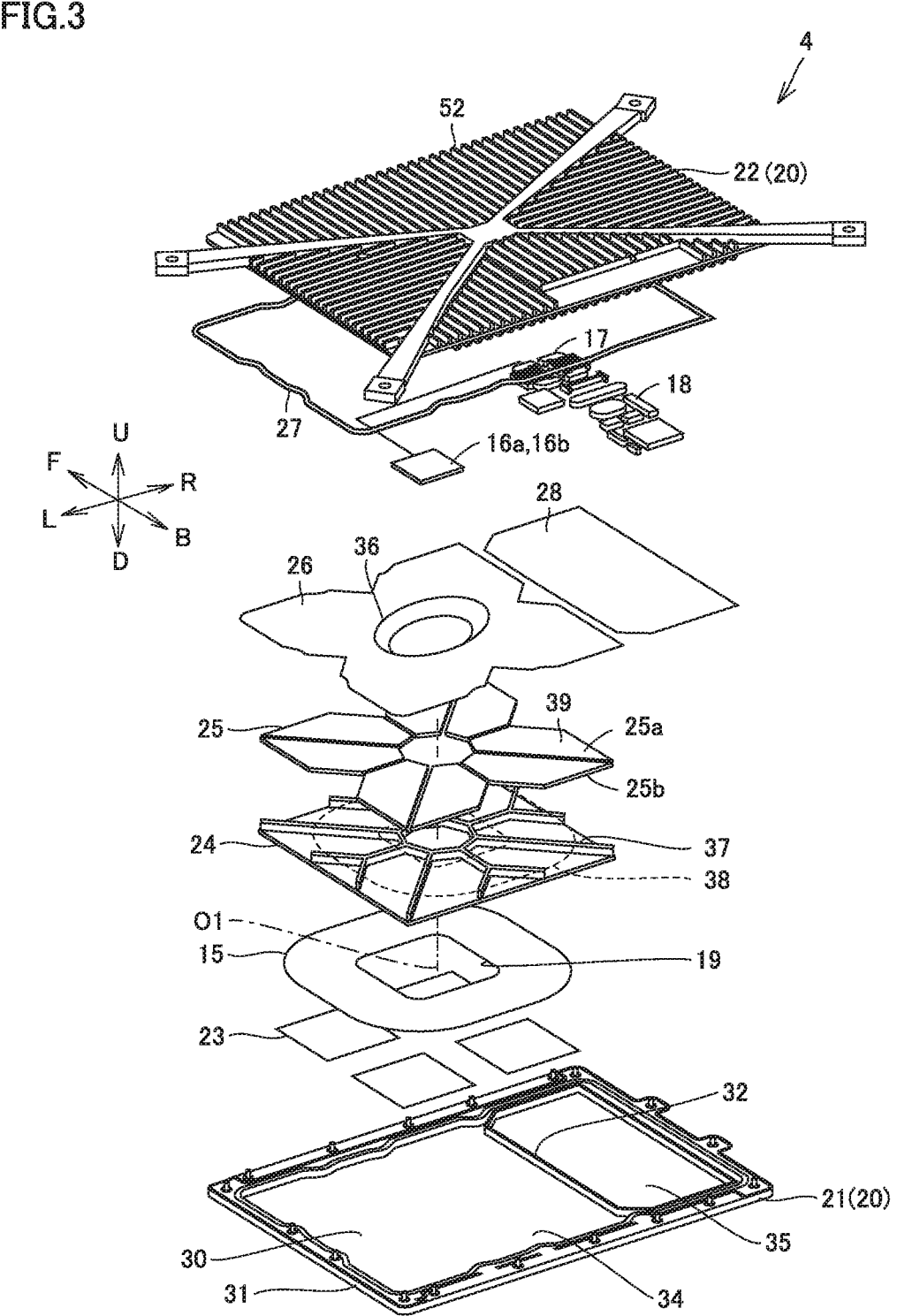
FIG. 3 is an exploded perspective view of a power-reception-side coil unit according to an embodiment.
Figure 4:
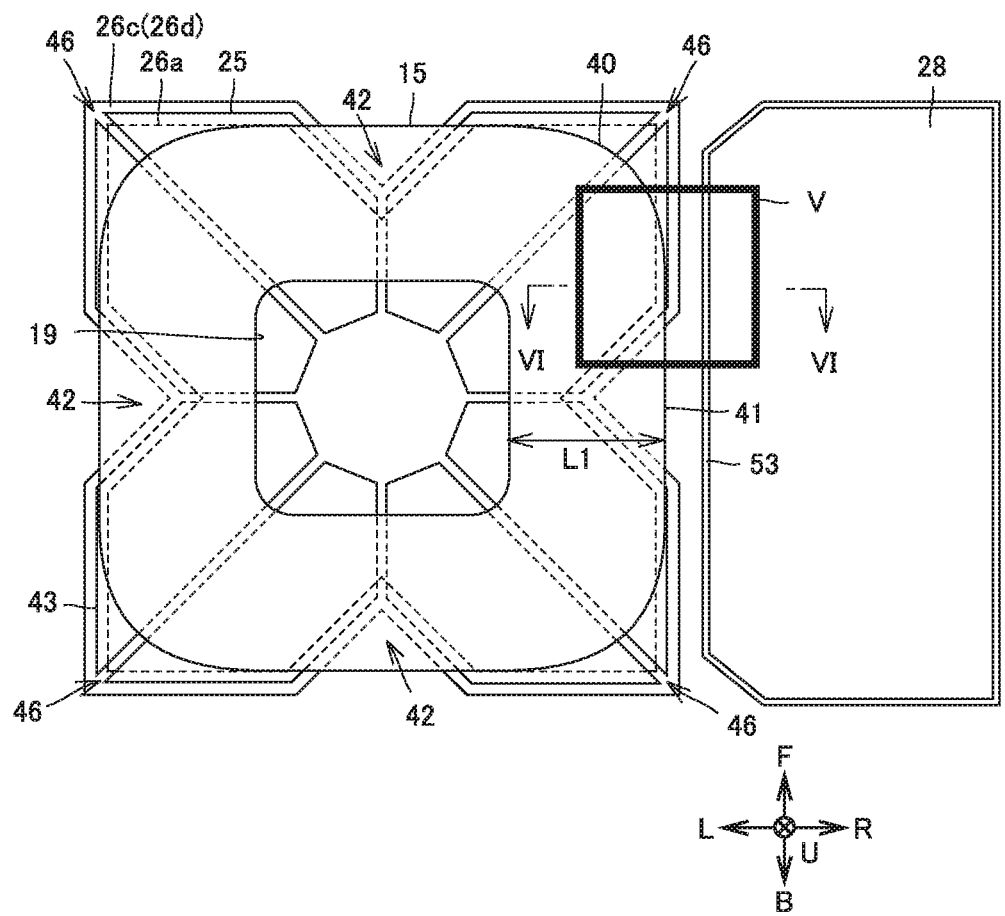
FIG. 4 is a transparent view of a power-reception-side coil unit as viewed from the bottom.
Figure 5:
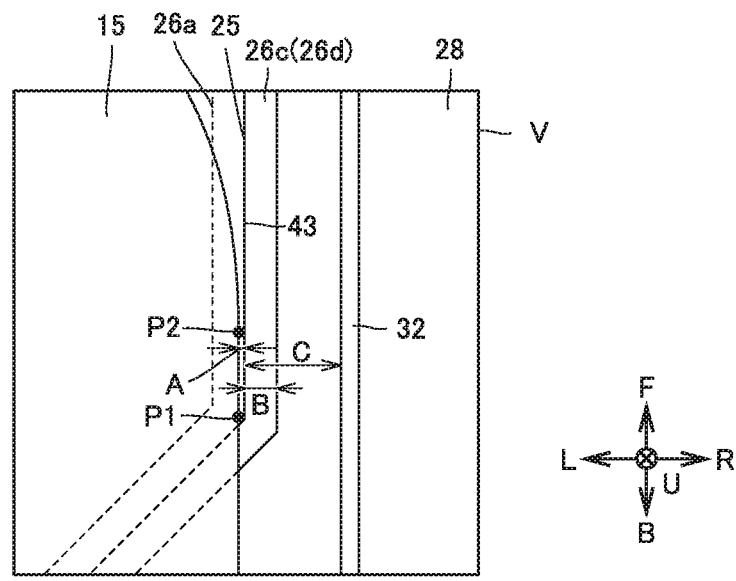
FIG. 5 is an enlarged view of box V in FIG. 4.
Figure 6:
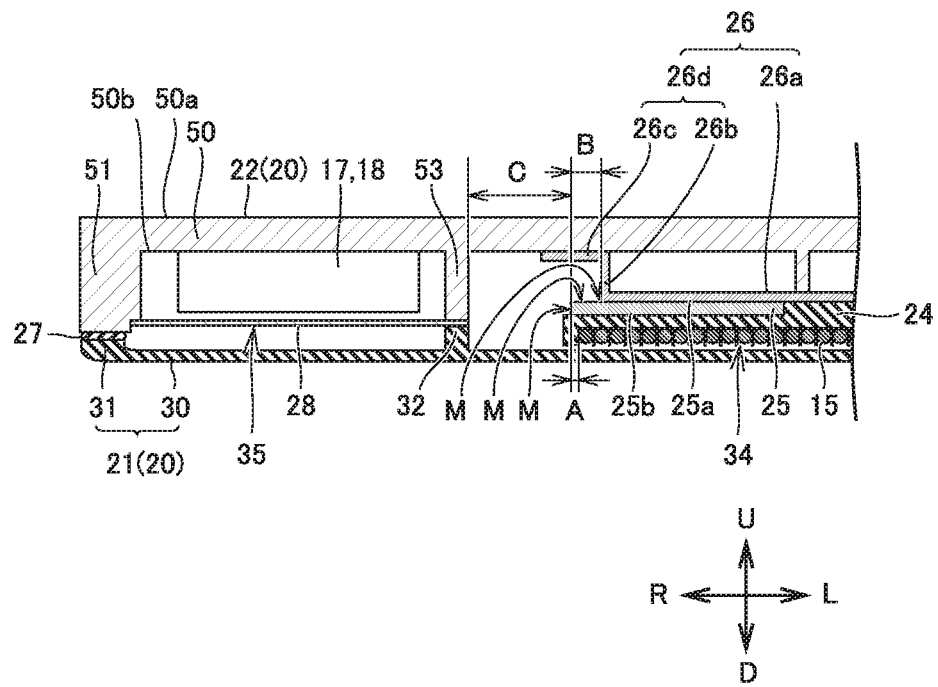
FIG. 6 is a cross-sectional view taken along VI-VI in FIG. 4.

With reference to FIG. 3 to FIG. 6, power-reception-side coil unit 4 according to the present embodiment is described. FIG. 3 is an exploded perspective view of power-reception-side coil unit 4 according to the present embodiment. FIG. 4 is a transparent view of power-reception-side coil unit 4 as viewed from the bottom (from the D direction). FIG. 4 shows a resin cover 21 and a protective sheet 23 as seen through from the bottom. However, FIG. 4 does not show a housing body 22. FIG. 5 is an enlarged view of box V in FIG. 4. FIG. 6 is a cross-sectional view taken along VI-VI in FIG. 4.

Power-reception-side coil unit 4 includes a housing 20, protective sheet 23, power reception coil 15, a bobbin 24, a ferrite 25, shields 26, 28, a sealing material 27, resonant capacitors 16a, 16b, filter 17, and rectifier 18.

Housing 20 includes resin cover 21 and housing body 22. Housing body 22 includes a base plate 50, a peripheral wall 51, cooling plates 52, and a partition wall 53, as shown in FIG. 3 and FIG. 6. Base plate 50 includes an outside principal surface 50a and an inside principal surface 50b, with outside principal surface 50a facing in the U direction (upward). Base plate 50 and base plate 150 of power-transmission-side coil unit 3 (described later) are equivalent to an example of the "metal plate member" according to the present disclosure.

Peripheral wall 51 extends irony the outer peripheral edge of base plate 50 in the D direction. Peripheral wall 51 has a ring shape along the outer peripheral edge of base plate 50.

A plurality of cooling plates 52 are formed on the upper face of base plate 50. However, FIG. 6 does not show cooling plates 52.

In FIG. 3, resin cover 21 is disposed in the D direction (on the lower side) relative to housing 20. Resin cover 21 includes a bottom plate 30, a peripheral wall 31, and a frame wall 32. Bottom plate 30, peripheral wall 31, and frame wall 32 are made of, for example, resin. Peripheral wall 31 rises up from the outer peripheral edge of bottom plate 30 in the U direction.

Frame wall 32 partitions the space in housing 20 into a coil space 34 and a device space 35, in cooperation with partition wall 53 as shown in FIG. 6.

Protective sheet 23, power reception coil 15, bobbin 24, ferrite 25, shield 26, and resonant capacitors 16a, 16b are disposed in coil space 34. Filter 17 and rectifier 18 are disposed in device space 35.

Protective sheet 23 is disposed on the upper face of bottom plate 30 in coil space 34. Power reception coil 15 is disposed on protective sheet 23. Power reception coil 15 surrounds winding axis O1 extending in the up-down direction. As shown in FIG. 4, the outer peripheral edge of power reception coil 15 includes four curved portions 40 and side portions 41 each of which connects adjacent curved portions 40. Power reception coil 15 has a hole 19 in its central part.

In FIG. 3, bobbin 24 is disposed on the upper side of power reception coil 15. Bobbin 24 has a coil groove 38 in its lower face for power reception coil 15 to be fitted therein. Coil groove 38 surrounds winding axis O1 in the same form as power reception coil 15. Bobbin 24 has a support wall 37 on its upper face.

Ferrite 25 is disposed on the upper face of bobbin 24. Specifically, ferrite 25 includes a first principal surface 25a and a second principal surface 25b, with second principal surface 25b being on the upper face of bobbin 24. Ferrite 25 includes a plurality of division ferrite plates 39. Division ferrite plates 39 surround winding axis O1. Division ferrite plates 39 are disposed on the upper face of bobbin 24 so that the peripheries of division ferrite plates 39 are supported by support wall 37.

As shown in FIG. 4, the outer peripheral edge of ferrite 25 is generally in the shape of a polygon. Ferrite 25 has four corners 46. The outer peripheral edge of ferrite 25 has four notches 42. Each notch 42 is located between corners 46 of ferrite 25. Corners 46 and notches 42 are connected to each other via side portions 43.

In FIG. 3, shield 26 is disposed on first principal surface 25a (upper face) of ferrite 25 in coil space 34. Shield 26 is made of a metallic material, such as aluminum. Shield 26 has a recess 36 in its central part, recess 36 extending in the D direction. As shown in FIG. 6, shield 26 includes a shield body 26a and a step portion 26d. Step portion 26d extends away from first principal surface 25a of ferrite 25 at the outer peripheral edge of shield 26. Step portion 26d extends from shield body 26a. Step portion 26d includes an uptight wall 26b extending away from first principal surface 25a of ferrite 25, and an extension 26c extending from upright wall 26b in parallel with shield body 26a. By providing step portion 26d, a part (exposed part) of first principal surface 25a of ferrite 25 is exposed on the outer periphery side (R side in FIG. 6) of ferrite 25.

In FIG. 3, resonant capacitors 16a, 16b are disposed in recess 36, on the upper side of shield 26.

In FIG. 6, shield 28 is fixed to the side (lower end face) of partition wall 53 facing in the D direction. Filter 17 and rectifier 18 are disposed on the upper side of shield 28. Filter 17 and rectifier 18 are disposed in device space 35 defined by partition wall 53, base plate 50 shield 28, and peripheral wall 51. Peripheral wall 51, partition wall 53, and shield 28 are equivalent to an example of the "metal member" according to the present disclosure. In the following, peripheral wall 51, partition wall 53, and shield 28 may be referred to as a "metal member" as a general term.

Sealing material 27 is disposed between peripheral wall 31 of resin cover 21 and peripheral wall 51 of housing body 22. Sealing material 27 can prevent a foreign substance, such as water, from entering housing 20.

As shown in FIG. 4 and FIG. 5, each side portion 41 of lower reception, coil 15 includes an edge part extending along the outer peripheral edge of ferrite 25. Specifically, the part extending from point P1 to point P2 in FIG. 5 is the edge part. Point P1 is a point corresponding to a connection point between notch 42 and side portion 43 of ferrite 25 in the L direction. Point P2 is a point of inflection of power reception coil 15, that is, a connection point between curved portion 40 and side portion 41. As can be seen from FIG. 4, power-reception-side coil unit 4 according to the present embodiment includes eight edge parts.

There is a desire for improving the wireless charging efficiency in wireless charging system 1 including a coil unit configured as described above. As one method for improving the charging efficiency, the coefficient of coupling between the coil units used in wireless charging system 1 may be increased. Strategies for increasing the coefficient of coupling are described with reference to FIG. 4 to FIG. 6, by taking power-reception-side coil unit 4 as an example. The following description also applies to power-transmission-side coil unit 3.

In the present embodiment, as a strategy for increasing the coefficient of coupling, the width of power reception coil 15 (in the R-L direction in FIG. 6) is increased by increasing the number of turns in the coil. Specifically, the number of turns in the coil is increased so that power reception coil 15 stretches close to the outer peripheral edge of ferrite 25 at the edge part. In other words, with reference to FIG. 5 and FIG. 6, length A is set short at the edge part of power reception coil 15 at which the outer peripheral edge of power reception coil 15 extends along the outer peripheral edge of ferrite 25, where length A is a length from the outer peripheral edge of power reception coil 15 to the outer peripheral edge of ferrite 25 in the separation direction (the R-L direction and the F-B direction). More specifically, length A is made shorter than length B of the exposed part. Accordingly, power reception coil 15 can be increased in width and can stretch close to the outer peripheral edge of ferrite 25 at the edge part.

Although the present embodiment describes an example in which the number of turns in the coil is increased so as to increase the coil width of power reception coil 15, other methods may be used to increase the coil width. For example, in the cross-sectional view shown in FIG. 6, the distance between adjacent coil wires may be increased so as to increase the coil width of power reception coil 15.

By increasing the width of power reception coil 15 and stretching power reception coil 15 close to the outer peripheral edge of ferrite 25 at the edge part as described above, the following two advantageous effects can be provided.

Figure 7:
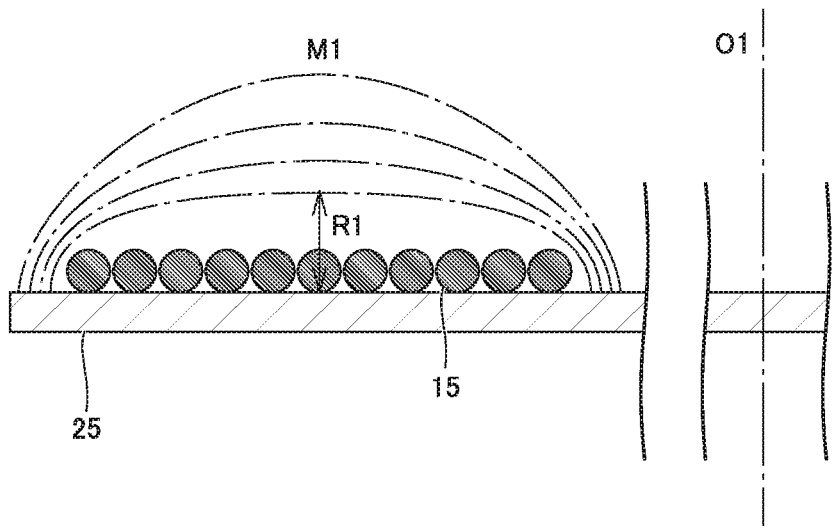
FIG. 7 is a schematic diagram for explaining a magnetic path of magnetic flux emitted from a power reception coil.

(1) First, the increase in the width of power reception coil 15 can increase the diameter of the magnetic path of magnetic flux emitted from power reception coil 15. FIG. 7 is a schematic diagram for explaining a magnetic path of magnetic flux emitted from power reception coil 15. As shown in FIG. 7, the magnetic flux formed by power reception coil 15 travels from the winding axis O1 side through an area above power reception coil 15 toward the outer periphery of ferrite 25 to be incident on ferrite 25. The incident magnetic flux travels back to the winding axis O1 side through ferrite 25. Thus, a magnetic path M1 is formed.

In FIG. 7, the diameter of magnetic path M1 is diameter R1. The diameter of magnetic path M1 is defined as the maximum value of the distance between power reception coil 15 and the magnetic path having an average magnetic flux density among a plurality of magnetic paths formed by power reception coil 15. A part of a plurality of magnetic paths formed by power reception coil 15 is interlinked with power-transmission-side coil unit 3 for example and forms a closed loop of power transfer between the coil units, thus allowing power transfer.

Figure 8:
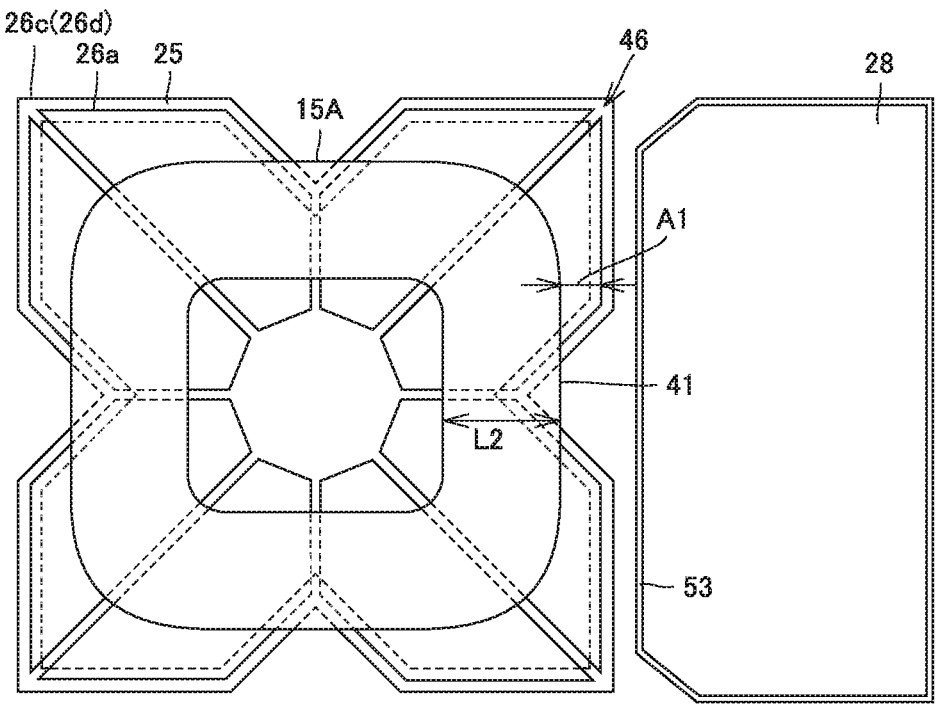
FIG. 8 is a transparent view of a power-reception-side coil unit according to a comparative example, as viewed from the bottom.

FIG. 8 is a transparent view of a power-reception-side coil unit according to a comparative example, as viewed from the bottom. Width L2 of power reception coil 15A in the power-reception-side coil unit according to the comparative example is smaller than width L1 of power reception coil 15 of power-reception-side coil unit 4 according to the present embodiment (L1>L2). Accordingly, at the edge part, length A1 from the outer peripheral edge of power reception coil 15A to the outer peripheral edge of ferrite 25 according to the comparative example is longer than length A (A1>A).

Figure 9:
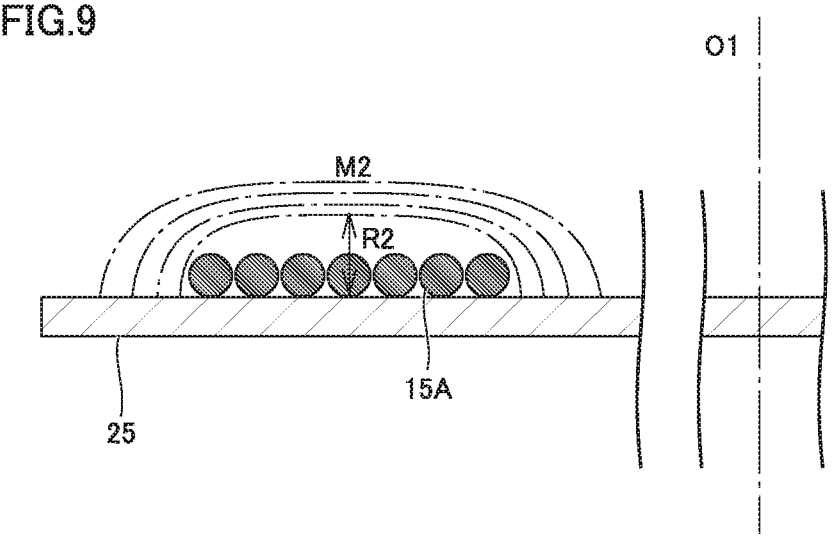
FIG. 9 is a schematic diagram for explaining a magnetic path of magnetic flux emitted from a power reception coil according to a comparative example.

FIG. 9 is a schematic diagram for explaining a magnetic path of magnetic flux emitted from power reception coil 15A. As shown in FIG. 9, the diameter of magnetic path M2 according to the comparative example is diameter R2. Width L2 of power reception coil 15A is smaller than width L1 of power reception coil 15, and thus diameter R2 of magnetic path M2 formed by power reception coil 15A is also smaller than diameter R1 (R1>R2).

As described above, the power transfer is, performed by a part of a plurality of magnetic paths formed by the coil being interlinked with the other coil unit. The increase in diameter of the magnetic path facilitates the interlinkage of the magnetic flux with the other coil unit, thus increasing the coefficient of coupling. That is, the increase in coil width in the coil units facilitates the interlinkage of the magnetic flux emitted from one coil unit with the other coil unit, thus facilitating formation of a closed loop of power transfer between the coil units. Thus, the coefficient of coupling can be increased.

(2) By stretching power reception coil 15 close to the outer peripheral edge of ferrite 25 at the edge part, the magnetic flux emitted from power-transmission-side coil unit 3 can easily expand in the direction toward the outside of housing 20 and thus can easily come around to first principal surface 25a of ferrite 25. This allows the magnetic flux to be easily incident on the exposed part of first principal surface 25a of ferrite 25.

At corners 46 of ferrite 25, a certain length can be secured between power reception coil 15 and a metal member (peripheral wall 51) of housing body 22. Therefore, the magnetic flux formed by power reception coil 15 is not easily interlinked with the metal member. At the edge part, however, power reception coil 15 stretching close to the outer, peripheral edge of ferrite 25 may cause the magnetic flux from power reception coil 15 to be interlinked with the metal member and thus cause an eddy current loss if length C from the outer peripheral edge of ferrite 25 to a metal member (shield 28, peripheral wall 51, and partition wall 53 [e.g., partition wall 53 for the edge part in box V in FIG. 4]) is short in the separation direction. Also, if length C from the outer peripheral edge of ferrite 25 to the metal member is short in the separation direction, the magnetic flux emitted from power-transmission-side coil unit 3 may be interlinked with the metal member, thus possibly decreasing the amount of magnetic flux incident on the exposed part of first principal surface 25a of ferrite 25.

Accordingly, in the present embodiment, length C from the outer peripheral edge of ferrite 25 to the metal member is made longer than length B of the exposed part in the separation direction, in addition to the above-described strategy. As one example, the following describes a part corresponding to the edge part included in box V in FIG. 4. That is, length C from the outer peripheral edge of ferrite 25 to partition wall 53 of housing body 22 is made longer than length B of the exposed part in the separation direction. In the present embodiment, length C is twice or more as long as length B.

Thus, by securing a long length C from the outer peripheral edge of ferrite 25 to partition wall 53, the magnetic flux formed by power reception coil 15 can be prevented from being interlinked with a metal member, such as shield 28 or partition wall 53, even if power reception coil 15 is increased in width and stretches close to the outer peripheral edge of ferrite 25 at the edge part. Thus, the generation of an eddy current loss can be prevented.

Further, by securing a long length C from the outer peripheral edge of ferrite 25 to partition wall 53, magnetic flux M from power-transmission-side coil unit 3 can be easily incident on the end of the exposed part in the L direction in FIG. 6. By making magnetic flux M incident on the end of the exposed part in the L direction in FIG. 6, a larger amount of magnetic flux M can be incident on the exposed part. The magnetic path of magnetic flux describes a circular arc (semicircle). In order to make magnetic flux M incident on the end of the exposed part in the L direction, length C from the outer peripheral edge of ferrite 25 to partition wall 53 in the R direction may be longer than length B of the exposed part.

Figure 10:
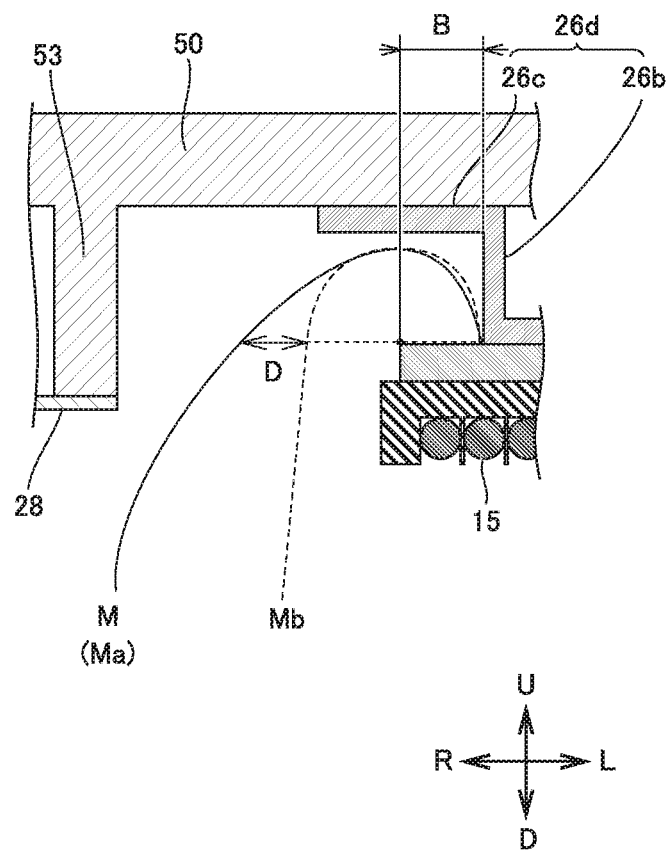
FIG. 10 is an enlarged view of an area around the exposed part in FIG. 6.

In the air, however, the diameter of the magnetic path may be large. FIG. 10 is an enlarged view of an area around the exposed part in FIG. 6. As shown in FIG. 10, the magnetic flux is incident on the end of the exposed part in the L direction, not through a magnetic path describing a perfect semicircle with a radius of B as indicated by magnetic flux Mb in the dotted line, but through a magnetic path expanding by length D in the R direction as indicated by the magnetic path of magnetic flux Ma. Accordingly, length C is made longer than length B of the exposed part (e.g., length C is made twice or more as long as length B), so that the magnetic flux M is not easily interlinked with shield 28 and partition wall 53 and thus can easily be incident on the end or the exposed part in the L direction. Accordingly, a large amount of magnetic flux M can be incident on the exposed part, thus increasing the coefficient of coupling.

Figure 11:
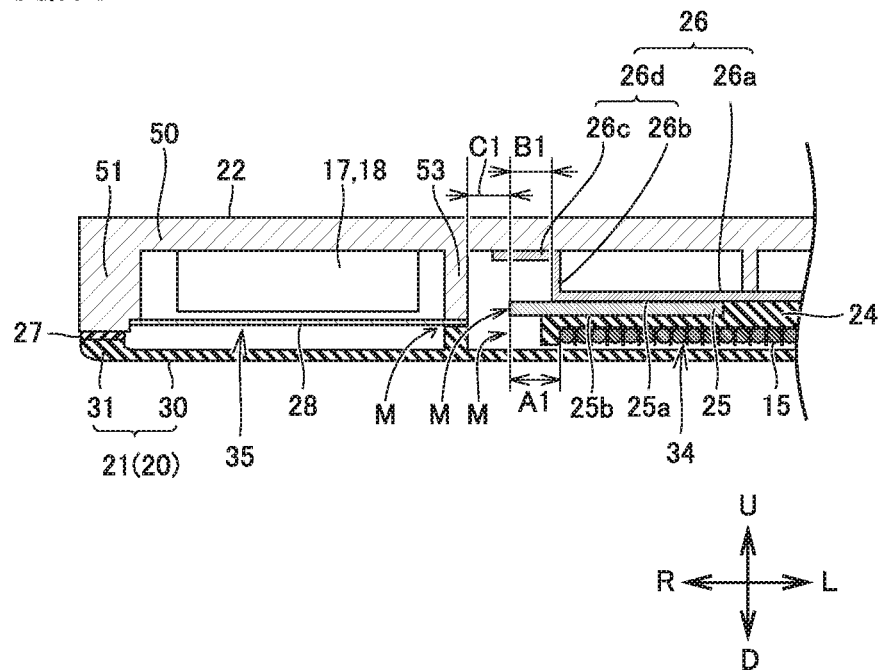
FIG. 11 is a cross-sectional view showing a part of a power-reception-side coil unit according to a comparative example.

FIG. 11 is a cross-sectional view showing a part of a power-reception-side coil unit according to a comparative example. As shown in FIG. 11, in the power-reception-side coil unit according to the comparative example, length C1 from the outer peripheral edge of ferrite 25 to partition wall 53 is about the same as length B1 of the exposed part in the separation direction (the R direction in FIG. 11). In this case, length C1 is short. Accordingly, among the magnetic fluxes emitted from the power-transmission-side coil unit, magnetic flux M that might come around to the end of the exposed part in the L direction is interlinked with shield 28 and fails to come around to the end of the exposed part in the L direction. This results in a lower coefficient of coupling.

<Power-Transmission-Side Coil Unit>

Figure 12:
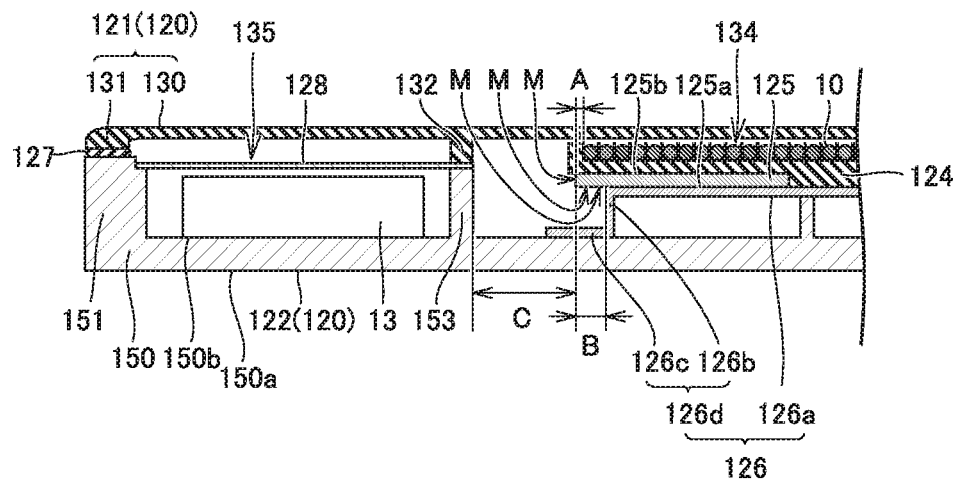
FIG. 12 is a cross-sectional view showing a part of a power-transmission-side coil unit.
Figure 12:
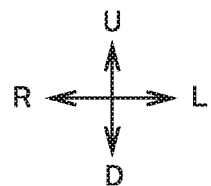

The basic configuration of power-transmission-side coil unit 3 is almost the same as that of power-reception-side coil unit 4 it in the U-D direction. Thus, the explanation is not repeated for the same configuration as that of power-reception-side coil unit 4. FIG. 12 is a cross-sectional view showing a part of power-transmission-side coil unit 3.

Power-transmission-side coil unit 3 includes a housing 120, a protective sheet, power transmission coil 10, a bobbin 124, a ferrite 125, shields 126, 128, a sealing material 127, resonant capacitors 11a, 11b, filter 12, and inverter 13.

Housing 120 includes a resin cover 121 and a housing body 122. Housing body 122 includes a base plate 150, a peripheral wall 151, and a partition wall 153. Base plate 150 includes an outside principal surface 150a and an inside principal surface 150b, with outside principal, surface 150a facing in the D direction (downward). Resin cover 121 is disposed in the U direction (on the upper side) relative to housing 120. Resin cover 121 includes a top plate 130, a peripheral wall 131, and a frame wall 132. Top plate 130, peripheral wall 131, and frame wall 132 are made of, for example, resin.

Frame wall 132 partitions the space in housing 120 into a coil space 134 and a device space 135, in cooperation with partition wall 153.

In coil space 134, bobbin 124 is disposed on the lower side of power transmission coil 10. Ferrite 125 includes a first principal surface 125a and a second principal surface 125b, with second principal surface 125b being on the lower face of bobbin 124.

Shield 126 is disposed on the first principal surface 125a (lower face) of ferrite 125. Shield 126 includes a shield body 126a and a step portion 126d. Step portion 126d extends away from first principal surface 125a of ferrite 125 at the outer periphery of shield 126. Step portion 126d extends from shield body 126a. Step portion 126d includes an upright wall 126b extending away from first principal surface 125a of ferrite 125, and an extension 126c extending from upright wall 126b in parallel with shield body 126a. By providing step portion 126d, a part (exposed part) of first principal surface 125a of ferrite 125 is exposed on the outer periphery side (R side in FIG. 12) of ferrite 125.

Shield 128 is fixed to the side (upper end face) of partition wall 153 facing in the U direction. Inverter 13 is disposed on the lower side of shield 128. Inverter 13 is disposed in device space 135 defined by partition wall 153, base plate 150, shield 128, and peripheral wall 151. Instead of device space 135, a radiator fin may be provided, for example. Peripheral wall 151, partition wall 153, and shield 128 are equivalent to an example of the "metal member" according to the present disclosure. If a radiator fin is provided instead of device space 135, the radiator fin is equivalent to an example of the "metal member" according to the present disclosure.

<Comparison of Advantageous Effects>

Figure 13:
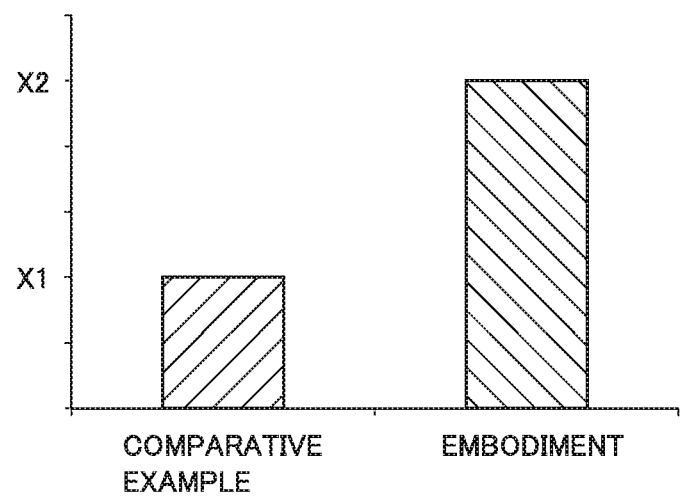
FIG. 13 is a diagram comparing the coefficient of coupling between a wireless charging system using a coil unit according to a comparative example, and a wireless charging system using a coil unit according to an embodiment.

FIG. 13 is a diagram comparing the coefficient of coupling between a wireless charging system using a coil twit according to a comparative example, and wireless charging system 1 using the coil unit according to the present embodiment. Here, the coefficient of coupling of a wireless charging system using a coil unit according to a comparative example is X1.

As shown in FIG. 13, by using the coil unit according to the present embodiment, the coefficient of coupling of wireless charging system 1 according to the present embodiment can be increased to X2 (>X1) higher than X1. The increased coefficient of coupling allows higher charging efficiency of wireless charging system 1.

As described above, the coil unit according to the present embodiment has an increased coil width with an increased number of turns in the coil (power reception coil 15 and the power transmission coil). At the edge part, the coil stretches close to the outer peripheral edge of the ferrite. The increased coil width allows an increased diameter of the magnetic path of magnetic flux emitted from the coil unit. Accordingly, the magnetic flux emitted from one coil unit can be easily incident on the other coil unit, thus facilitating formation of a closed loop of power transfer between the coil units. Further, since the coil stretches close to the outer peripheral edge of the ferrite at the edge part, the magnetic flux can easily come around to the first principal, surface of the ferrite and thus can easily be incident on the exposed part of the first principal surface of the ferrite. This can increase the amount of magnetic flux incident on the exposed part, thus increasing the coefficient of coupling.

Further, length C from the outer peripheral edge of the ferrite to a metal member (e.g., the partition wall) is made twice or more as long, as length B of the exposed part in the separation direction. By securing such a long length C, the magnetic flux emitted from one coil unit can be prevented from being interlinked with a metal member, such as the shield, the peripheral wall, and the partition wall of the other coil unit. Accordingly, the magnetic flux can be easily incident on the exposed part. Also, by setting length C twice or more as long as length B, the magnetic flux can be easily incident on the end of the exposed part in the L direction (see FIGS. 6 and 10). Accordingly, a larger amount of magnetic flux can be incident on the exposed part, and a high coefficient of coupling can be achieved.

(Variation 1)

The embodiment describes an example in which, length C from the outer peripheral edge of the ferrite to the metal member (e.g., the partition wall) is twice or more as long as length B of the exposed part in the separation direction. However, length C is not limited to being twice or more as long as length B. Length C at least longer than length B can increase the coefficient of coupling, as compared with length C equal to or shorter than length B.

(Variation 2)

In the embodiment, by increasing the number of turns in the coil to increase the coil width, the coil stretches close to the outer peripheral edge of the ferrite at the edge part. However, the coil can stretch close to the outer peripheral edge of the ferrite without changing the coil width.

In such a case, by stretching the coil close to the outer peripheral edge of the ferrite, the magnetic flux can easily come around to the first principal surface of the ferrite and thus can easily be incident on the exposed part of the first principal surface of the ferrite. Additionally, length C from the outer peripheral edge of the ferrite to the metal member (e.g., the partition wall) is made longer than length B of the exposed part in the separation direction. Accordingly, the magnetic flux emitted from one coil unit can be prevented from being interlinked with a metal member, such as the shield, the peripheral wall, and the partition wall of the other coil unit. Accordingly, the magnetic flux can be easily incident on the exposed part. Thus, a larger amount of magnetic flux can be incident on the exposed part, and a high coefficient of coupling can be achieved.

Although embodiments of the present disclosure have been described, it should be understood that the embodiments disclosed herein are by way of example in every respect, not by way of limitation. The scope of the present disclosure is defined by the terms of the claims and is intended to include any modification within the meaning and scope equivalent to the terms of the claims.

What is claimed is:

1. A coil unit comprising:
    a housing including a housing body made of metal, and a cover made of resin provided on the housing body; and
    a ferrite plate, a coil, a shield, and a metal member provided in the housing,
    the housing body including a metal plate member, the metal plate member including an inside principal surface and an outside principal surface,
    the cover being provided on a side of the inside principal surface and covering the metal plate member,
    the ferrite plate including
        a first principal surface facing the inside principal surface, and
        a second principal surface located opposite to the first principal surface,
    the coil being provided on a side of the second principal surface,
    the shield being provided on a side of the first principal surface,
    the metal member being adjacent to the coil and provided on the side of the inside principal surface,
    the shield having an outer peripheral edge including a step portion extending away from the first principal surface,
    the ferrite plate including an exposed part exposed through the shield by forming the step portion,
    in a separation direction from an outer peripheral edge of the ferrite plate to the metal member, a length from the outer peripheral edge of the ferrite plate to the metal member being longer than a length of the exposed part.

2. The coil unit according to claim 1, wherein
    the coil surrounds a winding axis passing through the first principal surface and the second principal surface,
    the coil has an outer peripheral edge including an edge part extending along the outer peripheral edge of the ferrite plate, and
    in the separation direction, a length from the edge part to the outer peripheral edge of the ferrite plate is shorter than the length of the exposed part.

3. The coil unit according to claim 1, wherein the length from the outer peripheral edge of the ferrite plate to the metal member is twice or more as long as the length of the exposed part.

* * * * *